United States Patent [19]

Cohen

[11] Patent Number: 4,729,632

[45] Date of Patent: Mar. 8, 1988

[54] COMMON PATH ACOUSTOPTIC ADAPTIVE LINEAR PREDICTORS

[75] Inventor: Jonathan D. Cohen, Hanover, Md.

[73] Assignee: The United States of America as represented by the Director of the National Security Agency, Ft. George G. Meade, Md.

[21] Appl. No.: 934,964

[22] Filed: Nov. 25, 1986

[51] Int. Cl.[4] .......................... G02B 5/18; G06G 9/00; G01S 13/58

[52] U.S. Cl. ................................ 350/162.12; 364/822

[58] Field of Search ...................... 350/162.12, 162.13, 350/162.14; 364/822

[56] References Cited

U.S. PATENT DOCUMENTS

| | | | |
|---|---|---|---|
| 4,225,938 | 9/1980 | Turpin | 364/822 |
| 4,389,092 | 6/1983 | Tamura | 350/162.12 |
| 4,440,472 | 4/1984 | Cohen | 350/162.12 |

*Primary Examiner*—Bruce Y. Arnold

*Assistant Examiner*—Jay P. Ryan

*Attorney, Agent, or Firm*—John R. Utermohle; Thomas O. Maser

[57] ABSTRACT

Common path time and frequency domain optical adaptive linear predictors are disclosed, characterized by wide bandwidth operation for use in channel equalization, source redundancy removal, speech encoding, and other areas. The predictors are noninterferometric, avoiding the instability of such processors in the prior art.

13 Claims, 8 Drawing Figures

COMMON PATH ACOUSTOPTIC ADAPTIVE LINEAR PREDICTORS

BACKGROUND OF THE INVENTION

The prediction of future values of a signal or process from past values has many applications including speech processing, source coding, channel equalization, noise and interference suppression and the like. For the most part, a predictor essentially removes redundancy from a signal. In the case of source encoding, for example, this may result in a lower data rate, lower transmitter power, or an improved error rate. In the case of channel equalization, reduced intersymbol interference and increased bandwidth may be realized.

Adaptive prediction, which was first developed in the 1960's, tailors the prediction function to the input or to a separate training signal by minimizing its prediction error according to come criterion. This approach may be appropriate if the relevant characteristics of the signal vary at a sufficiently low speed.

A linear predictor produces outputs which are restricted to linear combinations of past input values. Adaptive linear prediction has been applied with great success to channel equalization, speech analysis and encoding, source redundancy removal, noise and interference suppression, adaptive control, signal classification, and adpative antenna systems.

In an effort to provide adaptive linear predictors which can accommodate large bandwidths and offer high complexities, optical linear predictors have been developed. The present invention relates to an improved common path adaptive linear predictor having improved performance.

BRIEF DESCRIPTION OF THE PRIOR ART

As set forth above, optical adaptive linear predictors are known in the art. The first optical adaptive predictor was reported by J. F. Rhodes and D. E. Brown in an article entitled "Adaptive Filtering With Correlation Cancellation Loops," *Proc. Soc. Photo-Opt. Instrum. Eng.* 341, 140 (1982). This predictor utilized weighting in the time domain with continuous tapping. Subsequently, Rhodes and Brown developed a frequency domain architecture for adaptive predictors as reported by J. F. Rhodes, "Adaptive Filter With a Time-Domain Implementation Using Correlation Cancellation Loops," App. Opt. 22, 282 (1983).

The above architectures require the use of some type of light-to-light modulator such as a liquid crystal light valve which functions primarily as an integrator in time domain architectures and as a square-law device in frequency domain architectures.

A frequency domain adaptive predictor which does not require such a modulator was developed by A. VanderLugt as disclosed in an article entitled "Adaptive Optical Processor," *App. Opt.* 21, 4005 (1982). VanderLugt's frequency domain device uses two Bragg cells oriented perpendicular to each other to circumvent the need for a square law device.

The primary drawback of the VanderLugt architecture is that it is configured as an interferometer and suffers from sensitivity to component position and to air currents.

The present invention was developed in order to overcome these and other drawbacks of the prior architectures by providing a common path acoustooptic adaptive linear predictor which does not require an interferometer configuration.

SUMMARY OF THE INVENTION

Accordingly, it is a primary object of the invention to provide time and frequency domain common path adaptive linear predictors. In the frequency domain configuration, the predictor includes a source of collimated light and first and second Bragg cells arranged in perpendicular orientation. The Bragg cells are both driven by an input signal whose subsequent values are to be predicted and a reference tone. The Bragg cells diffract the collimated light which is transformed by a plurality of lenses to produce at a frequency plane a light beam having an amplitude corresponding with the power spectrum of the input signal and tone. A mask filter is placed in said transform plane for selecting said transform and removing other components of the diffracted light. A transform-plane spatial filter device is arranged beyond the mask filter for optically processing the diffracted light to produce an output corresponding with the predicted subsequent values of the input signal. The spatial filter device includes a third Bragg cell driven by a tone and a residual signal which comprises the difference between the input signal and the predicted signal. The third Bragg cell further diffracts the light from the mask filter. Additional lenses are provided for focusing the diffracted light on an area detector which produces a light output corresponding with the predicted subsequent values of the input signal.

It is yet another object of the invention to provide a time domain common path adaptive linear predictor including a space-integrating ambiguity processor for calculating the tap weight correlation between the input signal and the residual signal. Like the frequency domain predictor, the time domain predictor includes a source of collimated light, a pair of spaced Bragg cells oriented perpendicular to each other, and lenses for focusing the diffracted light from the Bragg cells. Unlike the frequency domain predictor, however, the second Bragg cell is driven by a reference tone and the residual signal, with the first Bragg cell being driven by a reference tone and the input signal. The time domain predictor also includes a mask filter, a third Bragg cell driven by a tone and the input signal, further lenses for transforming the light output from the third Bragg cell, and a point detector for receiving the transformed diffracted light output and producing an output corresponding with the predicted subsequent values of the input signal.

According to a further object of the invention, a mask is provided adjacent the second Bragg cell of both the frequency and time domain predictors for blocking non-diffracted light, whereby only diffracted light from the first and second Bragg cells is transmitted.

According to a more specific object of the invention, the Bragg cells may be driven by a signal including a reference tone. In an alternative embodiment, the reference tone may be eliminated, thereby utilizing the full Bragg cell bandwidth.

BRIEF DESCRIPTION OF THE FIGURES

Other objects and advantages of the subject invention will become apparent from a study of the following specification when viewed in the light of the accompanying drawings, in which.

DETAILED DESCRIPTION

The theory behind an adaptive linear predictor is to take past samples of a data signal u and make an estimate of, i.e. predict, its future values. Electrical linear predictors take the form of a transversal filter whose weights are calculated by correlating the residual signal with delayed versions of the input signal.

The concept behind an optical linear adaptive predictor involves the calculation of the weighting to be applied to the input signal. The weights function may be expressed as $$w(\tau,t) = G \int_{-\infty}^{\infty} z(a)u(a-\tau)F(t-a,\tau)da, \quad (1)$$

where

- t=time,
- $\tau$=delay,
- G=constant velocity of correction,
- u=input signal,
- z=residual difference between the input and predicted signals,
- F=filter response.

The predicted output û of the input signal u is expressed as $$\hat{u}(t) = \int_0^T u(t-\tau)w(\tau,t)d\tau. \quad (2)$$

Figure 1A:
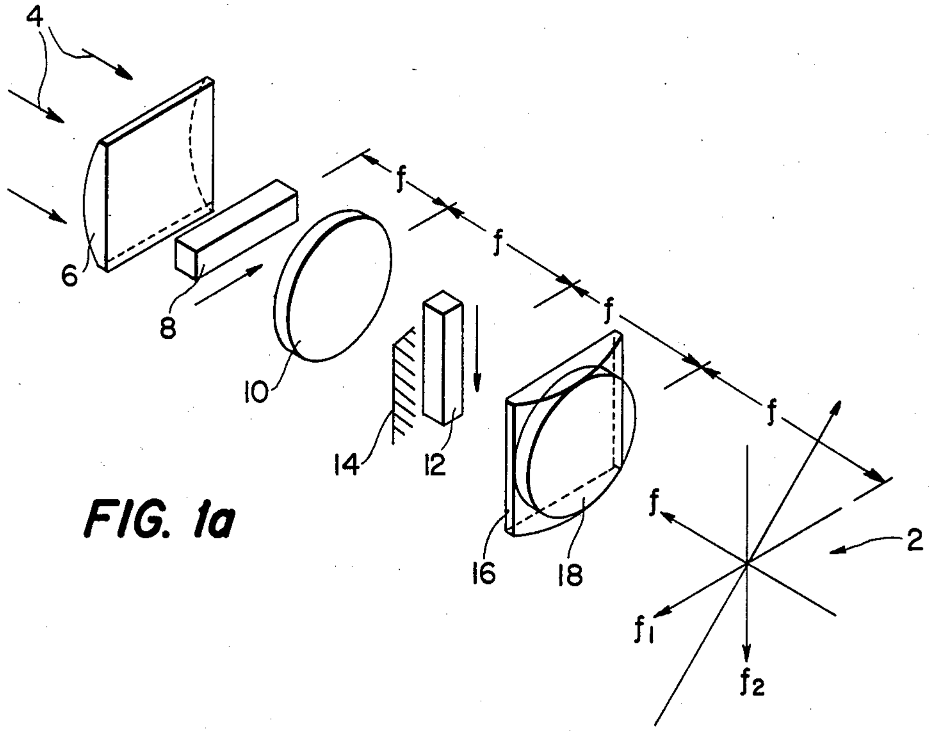
FIGS. 1*a* and 1*b* are optical circuit diagrams of the two stages, respectively, of a first embodiment of a frequency domain common path optical adaptive linear predictor according to the invention.

Referring now to FIG. 1*a*, there is shown the first stage of the frequency domain common path adaptive linear predictor according to the invention. Essentially, the first stage is used to generate the power spectrum of the input signal at the frequency plane 2 having axes f, $f_1$, and $f_2$.

A source of collimated light beams 4 is directed through a cylindrical lens 6 which concentrates the light vertically to pass through a first horizontally oriented acoustooptic modulator 8. One particular well known type of acoustooptic modulator is commonly referred to as a Bragg cell, which was used in the prototype development of this invention. Throughout the remainder of this description, the term "Bragg cell" shall be used. It is to be understood, however, that any type of acoustooptic modulator may be used in my invention. The light diffracted by the first Bragg cell is transformed by spherical lens 10 so that light directed through the second Bragg cell 12, which is oriented vertically, is vertically uniform and varies horizontally as the transform of the information in the first Bragg cell 8. A mask 14 is provided adjacent the second Bragg cell 12 for blocking the transmission of any undiffracted light from the Bragg cells. The horizontally varied light is relayed to the frequency plane 2 by a cylindrical lens 16 and spherical lens 18, with the spherical lens 18 transforming the light diffracted by the second Bragg cell 12.

The operation of the apparatus of FIG. 1*a* may be understood by considering the case when both Bragg cells are driven by a signal g on a carrier $f_o$. Opposite diffraction orders are used for the two Bragg cells. With appropriate scaling, the light field seen at the frequency plane is proportional to $$\int_{-\infty}^{\infty} g(t-\tau_1)\exp[j2\pi f_0(t-\tau_1)]p(t_1)\exp(-j2\pi\tau_1 f_1)d\tau_1 \cdot$$

$$\int_{-\infty}^{\infty} g^*(t-\tau_2)\exp[-j2\pi f_0(t-\tau_2)]p(\tau_2)\exp(-j2\pi\tau_2 f_2)d\tau_2$$

where p describes the aperture of the Bragg cells. When this is evaluated along the diagonal $f_1=-f_2=f$, the light amplitude at the frequency plane 2 is seen to be $$\left| \int_{-\infty}^{\infty} g(t-\tau)p(\tau)\exp[-j2\pi\tau(f+f_0)d\tau \right|^2,$$

which is the power spectrum.

More particularly, in accordance with the present invention, input to the first and second Bragg cells includes not only the input signal but also a reference tone. Thus the two Bragg cells receive the excitation $$\mathrm{Re}\exp(j2\pi f_o t)[u(t)+\exp(j2\pi f_r t)]$$

where $f_r$ is the reference frequency.

In the transform plane on diagonal f of FIG. 1*a*, the input amplitude is now $$P(f,t) = \left| \int_{-\infty}^{\infty} [u(t-\tau) + e^{j2\pi f_r(t-\tau)}]p(\tau)e^{-j2\pi\tau(f+f_0)}d\tau \right|^2 \quad (3)$$

$$= P_1(f,t) + P_2(f,t) + P_3(f,t),$$

where $$P_1(f,t) = \left| \int_{-\infty}^{\infty} u(t-\tau)p(\tau)e^{-j2\pi\tau(f+f_0)}d\tau \right|^2, \quad (4)$$

$$P_2(f,t) = \left| \int_{-\infty}^{\infty} p(\tau)e^{-j2\pi\tau(f+f_0+f_r)}d\tau \right|^2, \quad (5)$$

$$P_3(f,t) = 2\mathrm{Re}\, e^{-j2\pi f_r t} \int_{-\infty}^{\infty} u(t-\tau)p(\tau)e^{-j2\pi\tau(f+f_0-f_r)}d\tau. \quad (6)$$

In reality, only the amplitudes $P_1$ and $P_2$ are desired. With the proper choice of $f_r$, these three terms are spatially disjoint, and it is possible to block $P_3$. Assume that the functions u and p are bandlimited such that the transform of u is zero for frequencies (of absolute value) greater than B/2 and the transform of p is zero for frequencies greater than b/2, with $b<<B$. It is apparent from equations (4)-(6) that $$f_r > B+b \quad (7)$$

is sufficient.

Figure 1B:
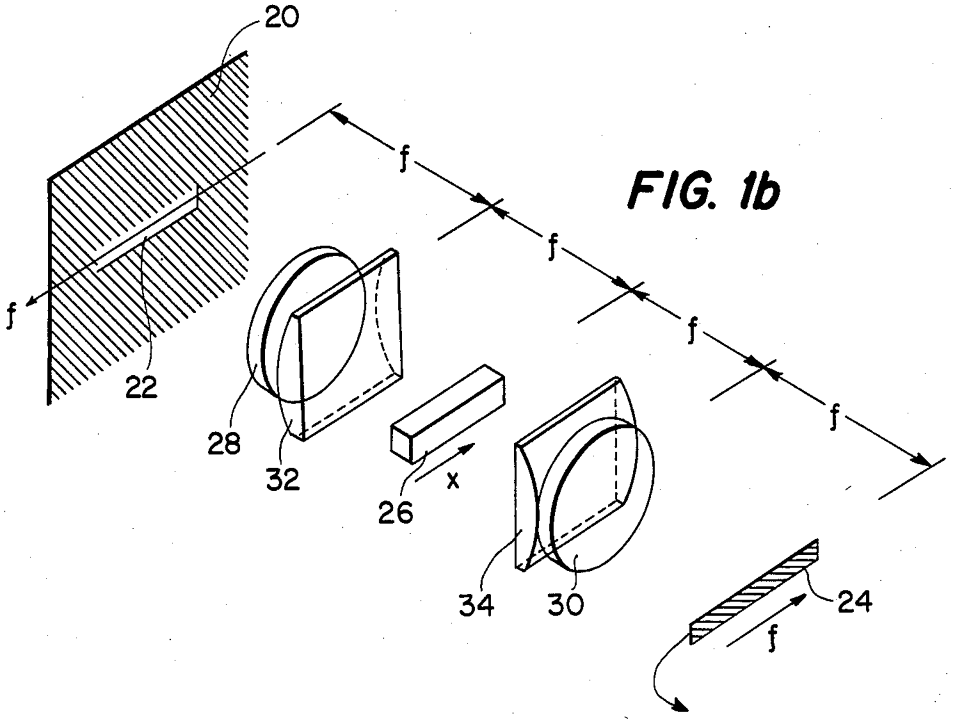

Referring now to FIG. 1b, there is shown a mask 20 in the transform plane of FIG. 1. The mask is opaque except for a slit 22 on the f axis. This slit is long enough to pass only $P_1$ and $P_2$ while blocking $P_3$. Light emerging from this slit enters the optical processor as shown in FIG. 1b. In the processor, light from the slit is imaged onto a large area summing detector 24 through a third Bragg cell 26. Specifically, spherical lenses 28, 30 map the horizontal position f to a horizontal position f' on the detector. With cylindrical lenses 32, 34 and spherical lenses 28, 30, vertical mapping is performed, whereby the vertical extent of the light beam is small enough to pass through the horizontally oriented third Bragg cell. The third Bragg cell is driven by the residual signal z and a reference tone. Accordingly, the input h(t) into the third Bragg cell is given by the following equation:

$$h(t) = Re\, e^{j2\pi f_0 t}[z(t) + e^{j2\pi f_r t}] \,. \tag{8}$$

The field amplitude at the detector will be $P_1(f',t)+P_2(f',t)$ convolved with $$H(f',t) = e^{j2\pi f_0 t} \int_{-\infty}^{\infty} z(t-x)p_2(x)e^{-2\pi x(f'+f_0)}dx + e^{j2\pi t(f_0+f_r)} \int_{-\infty}^{\infty} p(x)e^{-j2\pi x(f'+f_0+f_r)}dx, \tag{9}$$

the transform of the modulation from the third Bragg cell 26, where the function $p_2$ describes the profile imparted to light not diffracted by the third Bragg cell. For convenience, the two terms in equation (9) shall be labeled $H_1$ and $H_2$, respectively. Since only the terms $p_1{*}H_2$ and $p_2{*}H_1$ (* indicating convolution) are relevant, the other terms may be blocked provided that they are spatially separated from the desired terms. This occurs from the assumed condition $$f_r > \frac{3}{2}(B+b) \approx \frac{3}{2}B, \tag{10}$$

which implies relation (7) above.

With the undesired terms removed, the remaining two terms interfere on the detector 24. It is noted that the temporal frequencies of $p_1{*}H_2$ are contained in an interval of width $2b$ centered about $f_0+f_r$, while those of $p_2{*}H_1$ are in an interval of width B centered about $f_0$. Thus the interference term occurs about a carrier of frequency $f_r$ and, by equation (10), is disjoint in frequency with the other terms. A bandpass filter (not shown) may be placed after the detector to pass the interference term while blocking the other terms. The output term D(t) is $$2Re[P_1(f',t) *_{f} H_2(f',t)]\,[P_2(f',t) *_{f} H_1(f',t)] = \tag{11}$$

$$2Re\, e^{-j2\pi f_r t} \int_{-\infty}^{\infty} \left\{ \left| \int_{-\infty}^{\infty} u(t-\tau)p(\tau)e^{-j2\pi\tau(f'+2f_0+f_r)}d\tau \right|^2 * \right.$$

-continued $$\left.{}_{f'} \int_{-\infty}^{\infty} p(x)e^{j2\pi x f'} \right\} \cdot \left\{ \int_{-\infty}^{\infty} z(t-x)p_2(x)e^{-j2\pi x(f'+2f_0+f_r)}dx \; * \right.$$

$$\left. {}_{f'} \left| \int_{-\infty}^{\infty} p(x)e^{-j2\pi x f'} \right|^2 \right\} df'.$$

With some manipulation, D(t) may be expressed in the convenient form of a filtered version of u which is placed on a carrier of frequency $f_r$:

$$D(t) = 2Re\, e^{-j2\pi f_r t} \int_{-\infty}^{\infty} u(t-\tau)w(\tau,t)d\tau. \tag{12}$$

The time dependent weighting function w is given by $$w(\tau,t) = \int_{-\infty}^{\infty} z(a)u^*(a-\tau)F_r(t-a,\tau)da, \tag{13}$$

where $$F_r(t,\tau)=p(\tau)p(t+\tau)p(t)p_2(t)R(t). \tag{14}$$

The common path predictor described above provides performance similar to the VanderLugt design without the instability problems of an interferometer. The major drawback of the common path predictor, however, is that the Bragg cells must accommodate both the signals to be processed and the reference tones. From the restriction on $f_r$ set forth in equation (10), it is apparent that the Bragg cell bandwidths must be slightly more than twice the signal bandwidth.

Figure 2A:
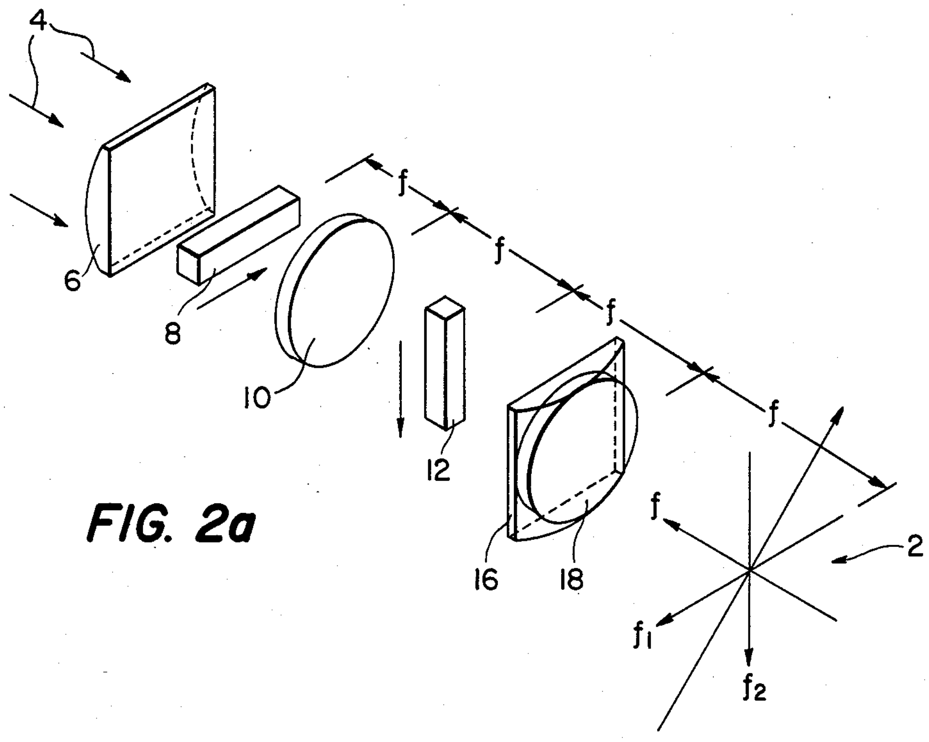
FIGS. 2*a* and 2*b* are optical circuit diagrams of an alternate embodiment of the frequency domain predictor of FIGS. 1*a* and 1*b*.
Figure 2B:
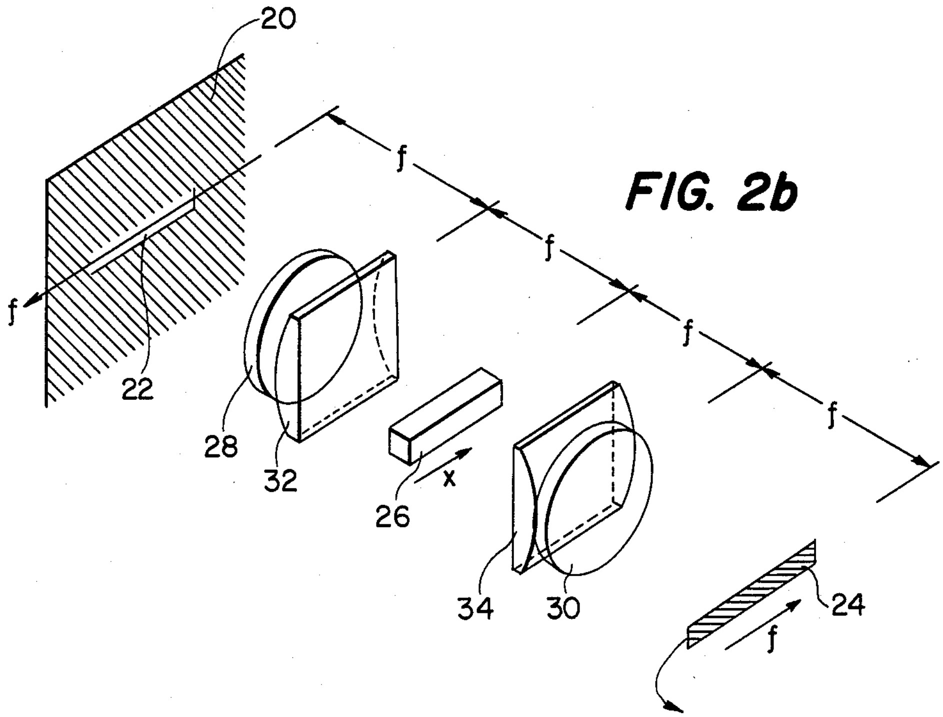

In an alternate embodiment shown in FIGS. 2a and 2b wherein like reference numerals designate like elements, the full Bragg cell bandwidth is used for the signal while retaining the common path frequency domain arrangement. Conceptually, this is achieved by taking $f_r = -f_o$. Physically, the mask 14 adjacent the second Bragg cell 12 is removed as shown in FIG. 2a, whereby the previously blocked undiffracted light may now be used as the reference tone. In operation, the reference tone is no longer used to drive the Bragg cells.

Accordingly, the Bragg cells 8 and 12 are driven by $$Re\, e^{j2\pi f_0 t}u(t). \tag{15}$$

so that the light leaving the first Bragg cell 8 has a field amplitude (including the undiffracted light) of $$p_1(\tau)+ce^{j2\pi f_0(t-\tau)}u(t-\tau)p(\tau), \tag{16}$$

where c is a constant and $p_1$ is the profile of the undiffracted light. Since the second Bragg cell 12 is in the transform plane of the first Bragg cell 8, it may be arranged so that the light diffracted from the first Bragg cell 8 illuminates the second Bragg cell 12 while the undiffracted light avoids the second Bragg cell but is allowed to continue. Accordingly, the field along the f axis is $$P(f,t)=P_1(f,t)+P_2(f,t), \tag{17}$$

where $$P_1(f,t) = \left| c \int_{-\infty}^{\infty} u(t-\tau)p(\tau)e^{-j2\pi\tau(f+f0)}\,d\tau \right|^2 \quad (18)$$

and $$P_2(f,t) = \left| \int_{-\infty}^{\infty} p_1(\tau)e^{-j2\pi\tau f}\,d\tau \right|^2 \quad (19)$$

Equations (17–19) are similar to equations (4) and (5). The undesired term $P_3$ is no longer present.

The second stage of the alternate predictor shown in FIG. 2*b* is identical to that of FIG. 1*b* except that the third Bragg cell 26 is now driven by a signal without a reference tone:

$$h(t) = Re\,e^{j2\pi f0t}z(t). \quad (20)$$

Analogous to the above computations, if $f_o > B+b$ (a condition always true in practice), the detector interference term is proportional to $$D(t) = 2Re\,e^{j2\pi f0t} \int_{-\infty}^{\infty} \left\{ \left| \int_{-\infty}^{\infty} u(t-\tau)p(\tau)e^{-j2\pi\tau(f+f0)}\,d\tau \right|^2 * \int_{-\infty}^{\infty} p_3(x)e^{j2\pi xf} \right\} \cdot \left\{ c \int_{-\infty}^{\infty} z(t-x)p_2(x)e^{-j2\pi x(f+f0)}\,dx * \int \left| \int_{-\infty}^{\infty} p_1(x)e^{-j2\pi xf} \right|^2 \right\} df, \quad (21)$$

where $p_3$ is the profile of light not diffracted by the third Bragg cell 26. The output may be expressed more conveniently as $$D(t) = 2Re\,e^{j2\pi f0t} \int_{-\infty}^{\infty} u(t-\tau)w(\tau,t)d\tau \quad (22)$$

with $$w(\tau,t) = \int_{-\infty}^{\infty} z(a)u^*(a-\tau)F_r(t-a,\tau)da, \quad (23)$$

where $$F_r(t,\tau) = cp(\tau)p(t+\tau)p_2(t)p_3(t)R_1(t). \quad (24)$$

As set forth above, the alternate embodiment of FIGS. 2*a* and 2*b* provides essentially the same result as the embodiment of FIGS. 1*a* and 1*b* without sacrificing half of the cell's bandwidth. The only expense is that the lenses of the embodiment of FIGS. 2*a* and 2*b* must accommodate a larger angular aperture. Accordingly, a space-integrating frequency domain adaptive linear predictor need not suffer the instability of interferometry.

FIGS. 3*a*–4*b* illustrate two embodiments of common path space-integrating time-domain adaptive linear predictors. Returning to the basic weighting and pediction equations (1) and (2), respectively, the correlation of z and u may be calculated using a space integrating arrangement shown in FIG. 3*a* which essentially comprises the space-integrating ambiguity processor disclosed in the Cohen U.S. Pat. No. 4,440,472.

Figure 3A:
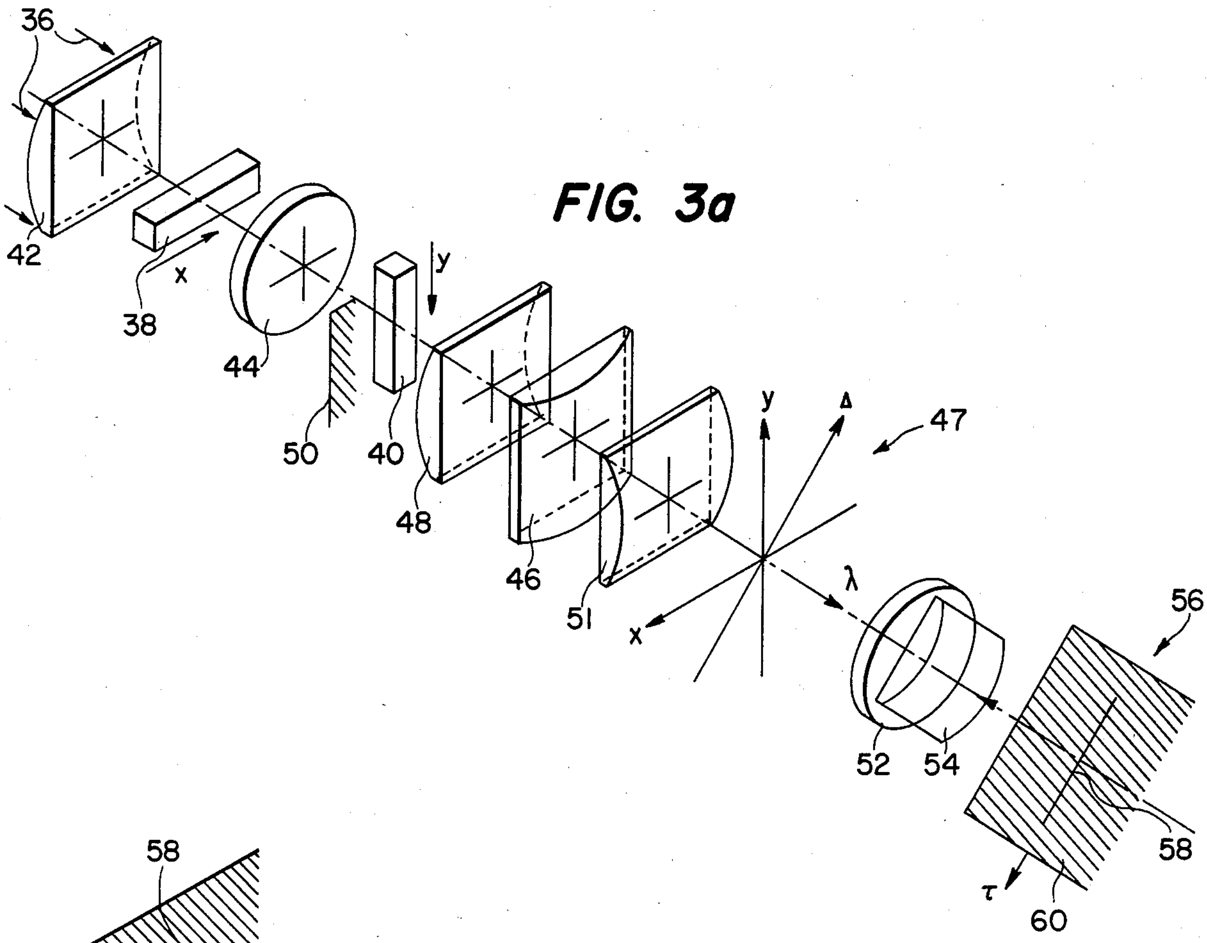
FIGS. 3*a* and 3*b* are optical circuit diagrams of the two stages, respectively, of a time domain common path optical adaptive linear predictor according to the invention.

The processor of FIG. 3*a* includes a source of collimated light beams 36 which pass through first and second Bragg cells 38, 40 which are oriented perpendicularly relative to one other. A cylindrical lens 42 concentrates the light vertically to pass through the first horizontally oriented Bragg cell 38. Spherical lens 44 and cylindrical lens 46 map a delay in the output from the first Bragg cell 38 to the horizontal position in a product plane 47, while cylindrical lenses 48, 51 identify the vertical position in the product plane with a delay from the second Bragg cell 40. A mask 50 adjacent the second Bragg cell 40 prevents the passage of undiffracted light.

Unlike the frequency domain configurations of FIGS. 1*a*–2*b*, the first and second Bragg cells 38, 40 of the time domain configuration are driven by different inputs. That is, the first cell is driven by the input signal u and a reference tone, or more particularly, $$Re\,e^{j2\pi f0t}[u(t) + e^{j2\pi frt}],$$

while the second cell is driven by the residual signal z and a reference tone, or $$Re\,e^{j2\pi f0t}[z(t) + e^{j2\pi frt}].$$

Assuming that the negative diffraction order is used in the first Bragg cell 38 and that the positive diffraction order is used in the second Bragg cell 40, the light amplitude seen in the product plane is proportional to $$A(x,y,t) = e^{j2\pi f0(x-y)}[u^*(t-x) + e^{-j2\pi fr(t-x)}][z(t-y) + e^{j2\pi fr(t-y)}]p(x)p(y), \quad (25)$$

where p describes the cell illumination and aperture.

FIG. 3*a* shows two auxiliary axes, labeled λ and Δ on the diagonals of the product plane. In terms of signals in the first and second Bragg cells, these axes may be identified with running time and differential time, respectively. Specifically, let $\lambda = x+y$ and $\Delta = x-y$. Then $$A'(\lambda,\Delta,t) = A\left(\frac{\lambda+\Delta}{2}, \frac{\lambda-\Delta}{2}, t\right) = p\left(\frac{\lambda-\Delta}{2}\right) p\left(\frac{\lambda+\Delta}{2}\right) e^{j2\pi f0\Delta}\Big[z\left(t-\frac{\lambda-\Delta}{2}\right) u^*\left(t-\frac{\lambda+\Delta}{2}\right) + e^{j2\pi fr\Delta}z\left(t-\frac{\lambda-\Delta}{2}\right) e^{-j2\pi fr[t-(\lambda+\Delta)/2]} + u^*\left(t-\frac{\lambda+\Delta}{2}\right) e^{j2\pi fr[t-(\lambda-\Delta)/2]}\Big]. \quad (26)$$

Light from the product plane 47 passes through an optional mask (not shown) which applies a weighting W(λ) to the light which then passes through a spherical lens 52 and a cylindrical lens 54 to reach an ambiguity plane 56. Lenses 52 and 54 transform in the λ direction while imaging the Δ axis to the τ axis. This transform is sampled in the center by a slit 58 in a mask 60 placed in the ambiguity plane. The resulting amplitude is $$P(\tau,t)=P_1(\tau,t)+P_2(\tau,t)+P_3(\tau,t) \quad (27)$$

where $$P_1(\tau,t) = e^{j2\pi f_0\tau} \int_{-\infty}^{\infty} z\left(t - \frac{\lambda-\tau}{2}\right) u^*\left(t - \frac{\lambda+\tau}{2}\right) p\left(\frac{\lambda-\tau}{2}\right) p\left(\frac{\lambda+\tau}{2}\right) W(\lambda)d\lambda, \quad (28)$$

$$P_2(\tau,t) = e^{j2\pi\tau(f_r+f_0)} \int_{-\infty}^{\infty} p\left(\frac{\lambda-\tau}{2}\right) p\left(\frac{\lambda+\tau}{2}\right) W(\lambda)d\lambda, \quad (29)$$

and $$P_3(\tau,t) = e^{j2\pi f_0\tau} \int_{-\infty}^{\infty} p\left(\frac{\lambda-\tau}{2}\right) p\left(\frac{\lambda+\tau}{2}\right) W(\lambda) \left[z\left(t - \frac{\lambda-\tau}{2}\right) e^{-j2\pi f_r[t-(\lambda+\tau)/2]} + u^*\left(t - \frac{\lambda+\tau}{2}\right) e^{j2\pi f_r[t-(\lambda-\tau)/2]}\right] d\lambda. \quad (30)$$

Assuming that the input signal u and the residual signal z have no appreciable components with frequencies larger than B/2 and that p and W are similarly confined to frequencies below b/2, it is apparent that $$f_r > \frac{B}{2} + 2b \quad (31)$$

implies $P_3=0$.

Figure 3B:
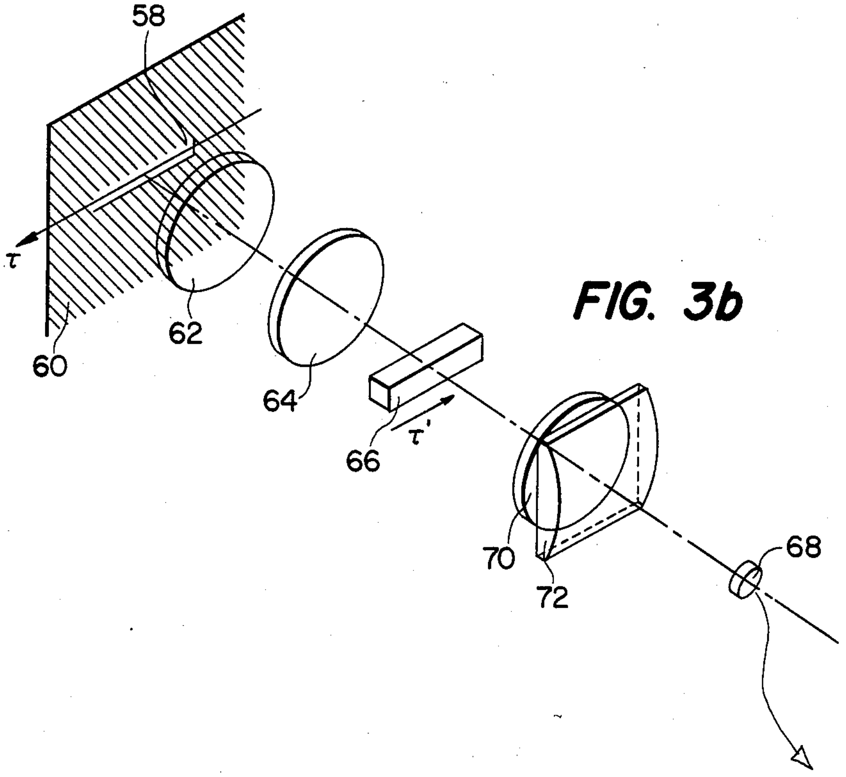

The second stage of the time domain predictor which applies the tap weights calculated by the first stage is shown in FIG. 3*b*. As shown therein, light leaving the slit 58 is focused by spherical lenses 62, 64 for imaging on the third Bragg cell 66 which is driven by the input signal u and a reference tone, or more particularly, by $$Re\, e^{j2\pi f_0 t}[u(t) + e^{j2\pi f_r t}].$$

The third Bragg cell has an aperture $p_2$. Light diffracted by the third cell is transformed and sampled at the origin by a detector 68 with the spherical lens 70 and the cylindrical lens 72 mapping the light onto the detector. The output of the detector is proportional to $$\left| \int_{-\infty}^{\infty} e^{-j2\pi f_0\tau} [P_1(\tau,t) + P_2(\tau,t)] [u(t-\tau) + e^{j2\pi f_r(t-\tau)}] d\tau \right|^2$$

which by equations (28) and (29) reduces to $$\left| \int_{-\infty}^{\infty} \left[ \int_{-\infty}^{\infty} z\left(t - \frac{\lambda-\tau}{2}\right) u^*\left(t - \frac{\lambda+\tau}{2}\right) p\left(\frac{\lambda-\tau}{2}\right) p\left(\frac{\lambda+\tau}{2}\right) W(\lambda)d\lambda \right] p_2(\tau)u(t-\tau)d\tau + e^{j2\pi f_r t} \int_{-\infty}^{\infty} p_2(\tau) \int_{-\infty}^{\infty} p\left(\frac{\lambda-\tau}{2}\right) \cdot p\left(\frac{\lambda+\tau}{2}\right) W(\lambda)d\lambda d\tau \right|^2.$$

Of the terms produced by the detector, only the interference term is desired. The interference term occurs on a carrier of frequency $f_r$ and is disjoint in frequency from the other terms if $$f_r > \frac{3}{2}(B + 3b) \approx \frac{3}{2}B. \quad (32)$$

Accordingly, a bandpass filter is applied to produce the output $$D(t) = 2Re\,Ce^{-j2\pi f_r t} \int_{-\infty}^{\infty} \int_{-\infty}^{\infty} z\left(t - \frac{\lambda-\tau}{2}\right) u^*\left(t - \frac{\lambda+\tau}{2}\right) p\left(\frac{\lambda-\tau}{2}\right) p\left(\frac{\lambda+\tau}{2}\right) W(\lambda)p_2(\tau)u(t-\tau)d\lambda d\tau, \quad (33)$$

where the constant C is given by $$C = \int_{-\infty}^{\infty} \int_{-\infty}^{\infty} p\left(\frac{\lambda-\tau}{2}\right) p\left(\frac{\lambda+\tau}{2}\right) W(\lambda)p_2(\tau)d\lambda d\tau. \quad (34)$$

This result may be expressed in the usual form $$D(t)=2Re\,e^{-j2\pi f_r t}\hat{u}(t) \quad (35)$$

with $$u(t) = \int_{-\infty}^{\infty} u(t-\tau)w(\tau,t)d\tau, \quad (36)$$

$$w(\tau,t) = \int_{-\infty}^{\infty} z(a)u^*(a-\tau)F_r(t-a,\tau)da, \quad (37)$$

and $$F_r(t,\tau) = Cp_2(\tau)p(t+\tau)p(t)W(2T+\tau). \quad (38)$$

This is the desired result.

From equation 38, it is apparent that while the characteristics of this processor are similar to the common path frequency domain space-integrating architectures, the integration function $F_r$ may be controlled more directly in the time domain processor: in the frequency domain embodiment, autocorrelations, which cannot be arbitrary, appear in $F_r$.

Like the frequency domain processor, the Bragg cells of the architecture of FIGS. 3*a* and 3*b* must accommodate both the input signals and reference tones. Thus it is required that the Bragg cells have slightly more than twice the bandwidth of the input signal.

Figure 4A:
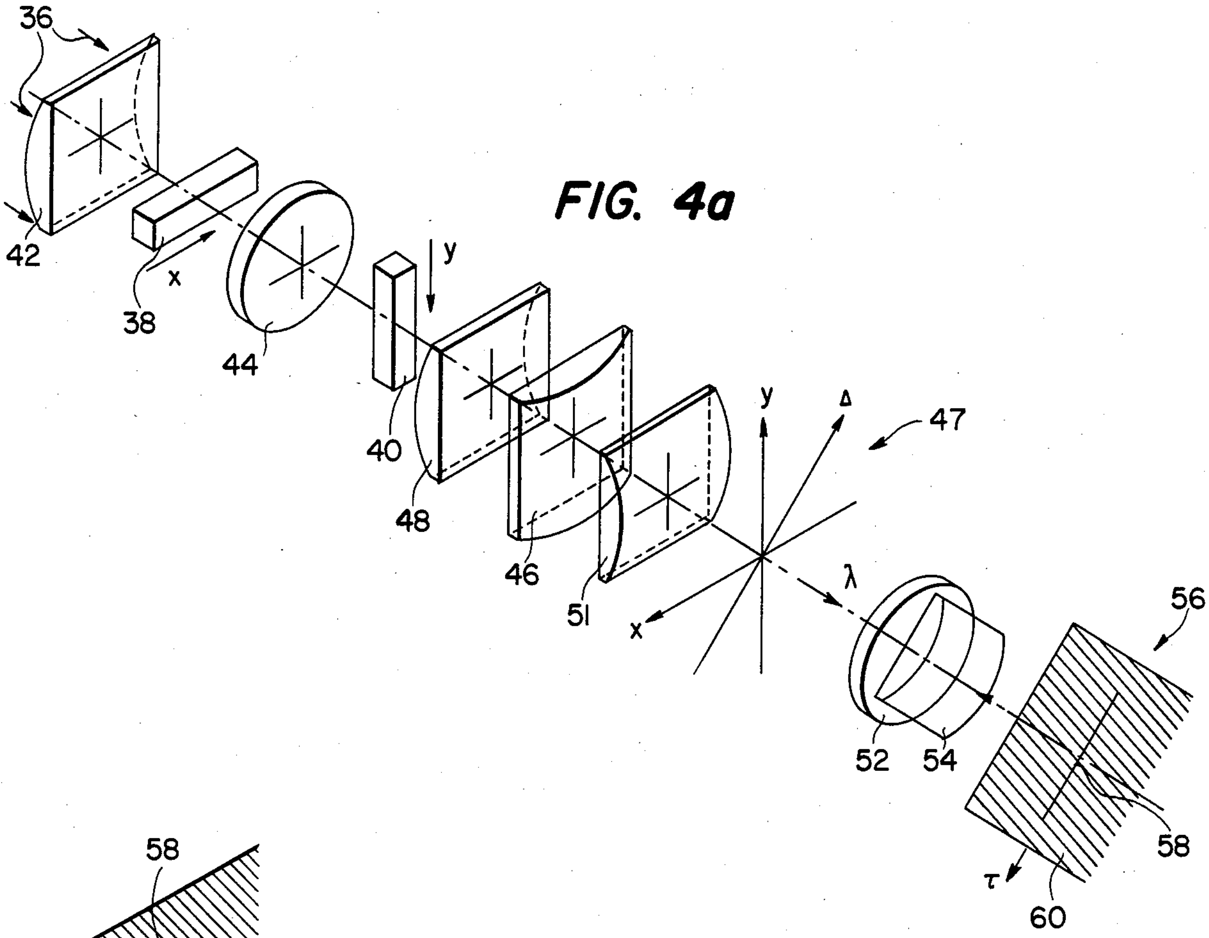
FIGS. 4*a* and 4*b* are optical circuit diagrams of an alternate embodiment of the time domain predictor of FIGS. 3*a* and 3*b*.
Figure 4B:
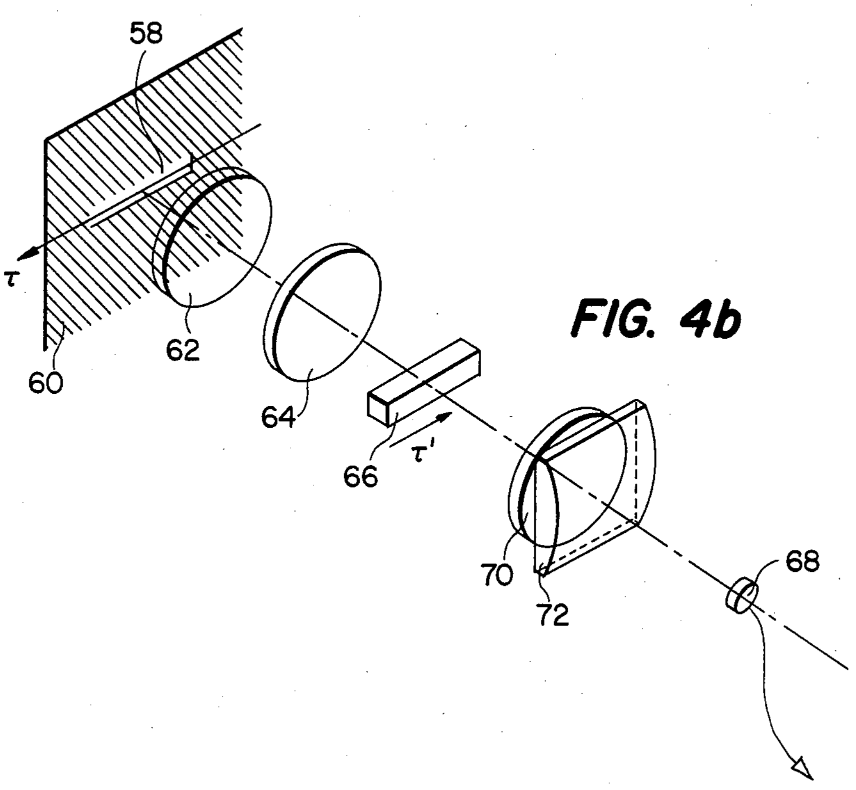

Analogous to the frequency domain space-integrating processors, a common path time domain predictor which circumvents this problem may be constructed as shown in FIGS. 4*a* and 4*b* wherein like reference numerals are used to represent like elements of FIGS. 3*a* and 3*b*. In the embodiment of FIGS. 4*a* and 4*b*, the mask 50 adjacent the second Bragg cell is removed, thereby allowing the undiffracted light to be used as a reference. Again, the signals which drive the Bragg cells are introduced without reference tones, and the undiffracted light from the first Bragg cell 38 is allowed to pass outside the second Bragg cell 40 and continue to the ambiguity plane 56, and the undiffracted light from the second Bragg cell 40 is blocked. The end result is essentially the same as with the embodiment of FIGS. 3*a* and 3*b*, with the only differences being that the output now occurs on a carrier of frequency $f_o$ and the constant C changes.

While in accordance with the provisions of the patent statutes the preferred forms and embodiments of the invention have been illustrated and described, it will be apparent to those skilled in the art that various changes and modifications may be made without deviating from the inventive concepts set forth above.

What is claimed is:

1. A frequency domain optical adaptive linear predictor for predicting subsequent values of an input signal, comprising (a) optical means for generating in a frequency plane the power spectrum of the input signal, said optical means including (1) a source of collimated light;

(2) first and second spaced acoustooptic modulators arranged in perpendicular orientation for diffracting light from said source of light, said acoustooptic modulators each being driven by an electrical signal including the input signal; and (3) first lens means for transforming the light diffracted by said first and second acoustooptic modulators, the transformed light having an amplitude corresponding with the power spectrum of the input signal at the frequency plane;

(b) mask filter means arranged at a transform plane for removing components of the diffracted light; and (c) transform-plane spatial filter means arranged beyond said mask filter means for optically processing said diffracted light to produce an output corresponding with the predicted subsequent values of the input signal, said transform-plane spatial filter means including (1) a third acoustooptic modulator driver by an electrical signal including a residual signal comprising the difference between the input signal and the predicted signal, said third acoustooptic modulator further diffracting the light from said mask filter means;

(2) second lens means for transforming the light from said third acoustooptic modulator; and (3) an area detector for receiving the light output from said third acoustooptic modulator, said light output comprising the convolution of the diffracted light corresponding with the power spectrum of the input signal and the transform of the modulation from said third acoustooptic modulator, said detector producing an output corresponding with predicted subsequent values of the input signal.

2. Apparatus as defined in claim 1, wherein the acoustooptic modulators are Bragg cells.

3. Apparatus as defined in claim 2, wherein said first lens means comprises a spherical lens arranged between said first and second Bragg cells and a cylindrical and spherical lens arranged between said second Bragg cell and the frequency plane.

4. Apparatus as defined in claim 3, wherein said second lens means comprises a spherical lens and a cylindrical lens arranged between said mask filter means and said third Bragg cell and a cylindrical lens and a spherical lens arranged between said third Bragg cell and said detector.

5. Apparatus as defined in claim 4, and further comprising a mask arranged adjacent said second Bragg cell for blocking non-diffracted light, whereby only diffracted light from said first and second Bragg cells is transmitted to said frequency plane.

6. Apparatus as defined in claim 5, wherein said electrical signals applied to said Bragg cells include a reference tone.

7. A space-integrating time domain optical adaptive linear predictor for predicting subsequent values of an input signal, comprising (a) space-integrating ambiguity processor means for calculating the tap weight correlation between the input signal and a residual signal comprising the difference between the input signal and a predicted signal, said processor comprising (1) a source of collimated light;

(2) first and second spaced acoustooptic modulators arranged in perpendicular orientation for diffracting light from said source, said first acoustooptic modulator being driven by an electrical signal including the input signal and said second acoustooptic modulator being driven by an electrical signal including the residual signal;

(3) first lens means for mapping the outputs of said first and second acoustooptic modulators to horizontal and vertical positions in a product plane; and (4) second lens means for transforming the light in the product plane to separate axes in an ambiguity plane;

(b) mask filter means arranged at the ambiguity plane for removing a component of the diffracted light; and (c) means arranged beyond said mask filter means for optically processing said diffracted light to produce an output corresponding with the predicted subsequent values of the input signal, said processing means comprising (1) a third acoustooptic modulator driven by an electrical signal including the input signal, said third acoustooptic modulator further diffracting the light from said mask filter means;

(2) third lens means for transforming the diffracted light output from said third acoustooptic modulator; and (3) a detector for receiving the transformed diffracted light output, said detector producing an output corresponding with predicted subsequent values of the input signal.

8. Apparatus as defined in claim 7, wherein said acoustooptic modulators are Bragg cells.

9. Apparatus as defined in claim 8, wherein said first lens means comprises a spherical lens arranged between said first and second Bragg cells and a plurality of successively spaced cylindrical lenses arranged between said second Bragg cell and the product plane.

10. Apparatus as defined in claim 9, wherein said second lens means comprises a spherical lens and cylindrical lens arranged between said product and ambiguity planes.

11. Apparatus as defined in claim 10, wherein said third lens means comprises a spherical lens and cylindrical lens arranged between said third Bragg cell and said detector and a plurality of spherical lenses arranged between said ambiguity plane and said third Bragg cell.

12. Apparatus as defined in claim 11, and further comprising a mask arranged adjacent said second Bragg cell for blocking non-diffracted light, whereby only diffracted light from said first and second Bragg cells is transmitted to said product plane.

13. Apparatus as defined in claim 12, wherein said carrier frequencies applied to said Bragg cells include a reference tone.

* * * * *